INVENTOR.
WILLIAM S. SHORE

BY

Roy Davis
ATTORNEY

INVENTOR.
WILLIAM S. SHORE
BY
Roy Davis
ATTORNEY

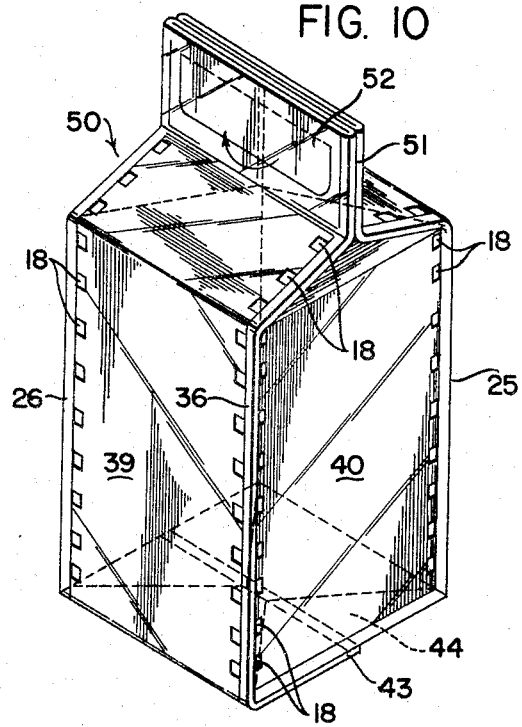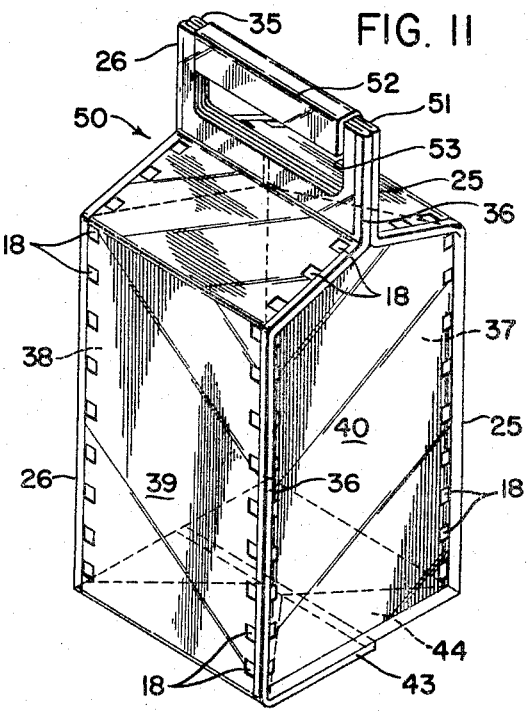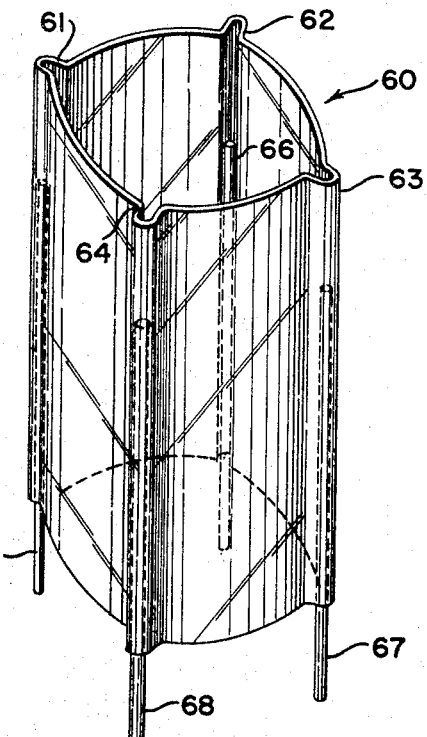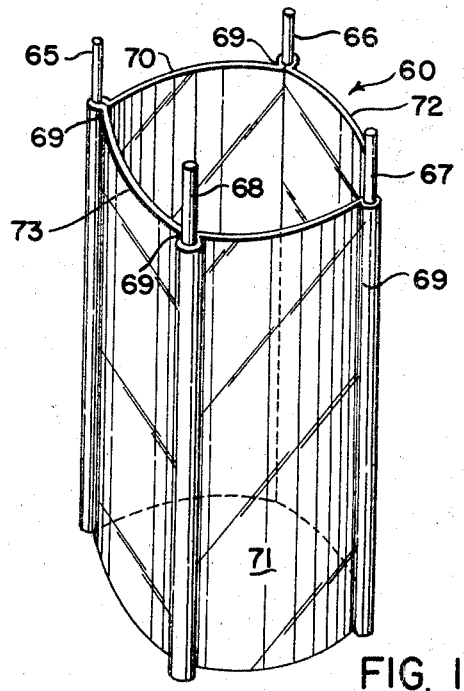

United States Patent Office 3,434,652
Patented Mar. 25, 1969

3,434,652
SELF-SUPPORTING PLASTIC CONTAINER
AND METHOD OF MAKING SAME
William S. Shore, Mayfield Heights, Ohio, assignor to Diamond Shamrock Corporation, a corporation of Delaware
Continuation-in-part of application Ser. No. 567,935, July 26, 1966. This application July 18, 1967, Ser. No. 654,241
Int. Cl. B65d 5/46, 5/74, 5/02
U.S. Cl. 229—52                                    13 Claims

ABSTRACT OF THE DISCLOSURE

The disclosure is directed to a thin-walled, self-supporting container of polyhedron shape formed of flexible plastic sheet, as well as a method of fabricating the container. The body of the container is of generally tubular form and is generally polygonal in cross-section. The intersections of the generally polygonal side walls are provided with external ribs to provide rigidity for the upright body portion.

*Cross reference to related application*

This application is a continuation-in-part of U.S. application Ser. No. 567,935, now abandoned, filed July 26, 1966.

*Background of the invention*

The invention relates to self-supporting, upright containers and especially to sealed containers used to package liquids such as milk and other liquid food products. More particularly, the invention relates to containers formed of flexible plastic sheet. While plastic containers for packaging milk, fruit juices, bleaches, detergents and other liquids, as well as granulated or powdered solids, are well known, such plastic containers are usually molded such as by blow molding, or other molding techniques well known in the area. This is generally necessary since such containers require a substantial wall thickness in order to be self-supporting and sufficiently rigid to maintain their shape when filled. Containers so constructed are costly to produce and take up considerable space during transportation and storage in between manufacture and packaging of the particular product. Also, since such thick-walled plastic containers are commonly individually molded, any imprinting, decorative design or other trade dress must be formed in the mold or must be specially imprinted thereon after each bottle or container is fabricated.

While relatively inexpensive paper containers are used by many dairies and other food packaging concerns, no way has yet been found to similarly fabricate a thin-walled, self-supporting container from flexible plastic sheet which may be transparent, as is the case with clear glass, to better exhibit the product to the consumer.

The container of the present invention and method of fabricating the container, however, overcome the difficulties and disadvantages indicated above and provide other features and advantages not obtainable from the prior art.

*Summary of the invention*

It is among the objects of the invention to provide a self-supporting container fabricated from relatively thin, flexible plastic sheet.

Another object of the invention is to provide self-supporting, liquid-tight containers which may be shipped to and stored at a packaging facility in partly fabricated flat strips in roll form.

A further object is to provide a method of fabricating a container of the type stated from a single length of light gauge flexible plastic sheet of either flat or tubular form.

Still another object is to provide a thin-walled container of flexible plastic sheet having a reinforcing frame formed integral therewith which makes the container self-supporting irrespective of its side wall thickness.

These and other objects of the invention are accomplished by the container construction and method of fabrication thereof embodied in the present invention.

According to the fabricating method of the invention, there is provided the improvement which comprises the steps of:

(1) Adhering adjacent, narrow, superposed, longitudinal portions of a tubular length of plastic sheet at at least three perimetrically spaced locations to form at least three integral, parallel, external ribs, (2) Forming a container body portion of polygonal cross-section intermediate the ends of the length, the ribs being located at the intersections of the side walls of the body portion, and (3) Collapsing and folding the opposite ends of the length to provide a closed base at one end and a top closure at the other end.

The adhering of the adjacent portions of the plastic sheet may be accomplished, for example, by heat-sealing, by dielectric treatment or even by ultrasonic techniques. According to one aspect of the method, the sealing is accomplished by passing the adjacent portions of the plastic sheet to be adhered between thin-rimmed, hot-squeeze rolls which both form and seal the ribs.

As a supplemental aspect of the method, extended transverse seals may be formed along the edges of the side panels at spaced locations angularly disposed relative to the ribs, preferably perpendicular thereto. The extended seals serve to lend added rigidity to the side walls and reduce bulging of the side walls due to hydrostatic pressure when the container is filled.

The article embodying the invention is a thin-walled container formed of flexible plastic sheet and including an upright tubular body portion having generally polygonal side panels and a generally polygonal transverse cross section. Plastic means provide rigidity for the body portion at the intersection of the side panels, the means including at each intersection, two adjacent portions of the flexible plastic sheet adhered to one another to form an integral external rib.

According to one embodiment of the container, the side panels are generally rectangular and the body portion has a generally rectangular, transverse cross-section.

According to an alternate form of the container, the side panels are provided with spaced transverse seals angularly disposed relative to and extending from the ribs. For the sake of ease of fabrication, the seals generally extend laterally across the side panels only a small portion of the total width thereof. As indicated above, the seals serve to lend added rigidity to the side panels and reduce the bulging thereof due to hydrostatic pressure when the container is filled with a liquid.

According to still another aspect of the invention, wherein the body portion of the container is quadrilateral in cross-section, adjacent portions of plastic sheet, located at one of the four intersections of the side walls, are adhered together to form a relatively wide strip while, at the same time, reducing the cross-sectional area for the body portion near the top thereof. An opening is provided in the strip thus formed so that it may be used as a pouring handle for pouring liquid from the top closure of the container when the closure is opened.

While thermoplastic material is the preferred material for the container, other material that lends itself to post operational plastic forming may also be used.

Brief description of the drawings

Other objects, uses and advantages of the invention will become apparent from a reading of the following specification and claims together with the accompanying drawings, wherein like parts are referred to and indicated by like reference numerals, and wherein:

FIGURES 7 through 11, inclusive, illustrate subsequent sequential fabrication steps for making a container according to the invention;

FIGURES 12 and 13 illustrate an alternate method of fabricating the reinforcing frame of the thin-walled container by the use of rigid tubes or rods.

Description of the preferred embodiments

Referring more particularly to the drawings, there is shown in FIGURE 11 a self-supporting, thin-walled plastic container 50 formed of flexible plastic sheet in accordance with the invention.

The container 50 is fabricated from a single sheet of relatively thin thermoplastic material, such as for example, one of the polyvinylchlorides, linear polyethylene, polypropylene, nylon or similar thermoplastic materials having the desirable physical characteristics of transparency, and high impact strength.

Containers made from such materials of between 4 and 10 mils thickness, such as contemplated here, are not normally self-supporting but assume a bag or pouch-like shape conforming to the bulk of the contained materials when used to package liquids, or solids in granular or powdered form.

Figure 1:
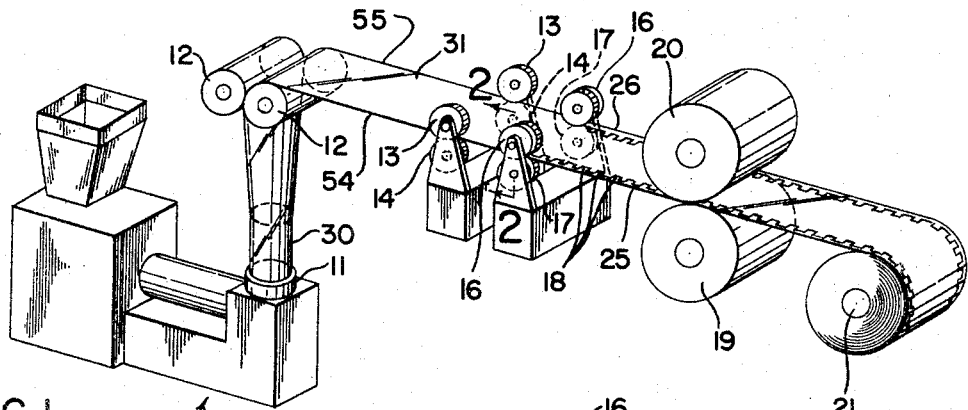
FIGURE 1 is a schematic diagram in perspective of the initial fabricating steps employed in forming a tubular length of flexible plastic material in flattened form with marginal portions thereof adhered to one another to form two opposed integral external ribs, and also for imprinting the flattened tubular length of flexible plastic with appropriate trade dress.
Figure 2:
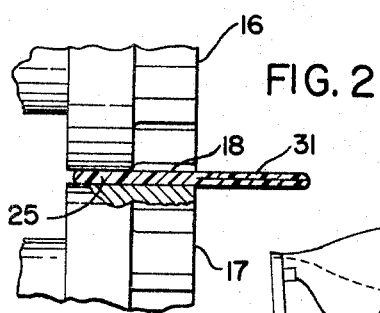
FIGURE 2 is a fragmentary sectional view on an enlarged scale taken on the line 2—2 of FIGURE 1.
Figure 3:
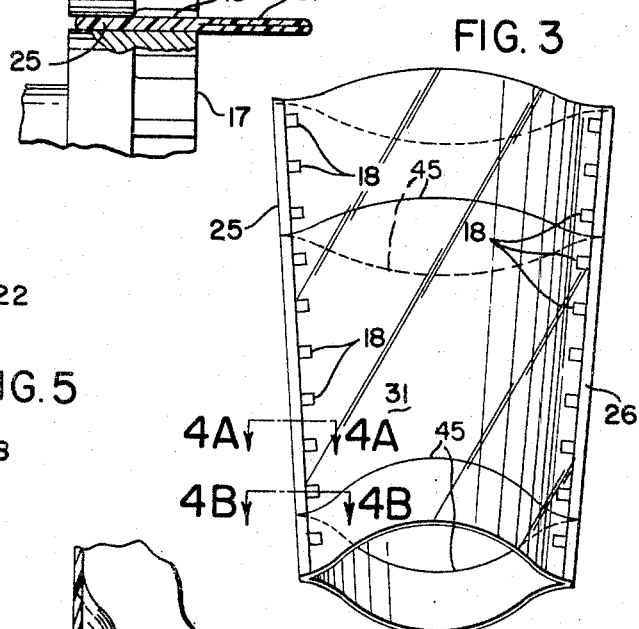
FIGURE 3 is a perspective view showing a tubular length of flexible plastic sheet having opposed marginal portions adhered together to form integral external ribs and also having lateral seals formed therein according to the process diagramed in FIGURE 1.

To fabricate the container 50 of suitable size for packaging one-half gallon of liquids, such as milk, fruit juices and the like, there is formed, as a first step, a tubular sleeve 30 of linear polyethylene with a wall thickness of about 10 mils and a circumference of approximately 18 inches. While the sleeve 30 could be fabricated from a single flat sheet of material curved upon itself and heat-sealed along the meeting edges to form a circular tube, the preferred and most economical method of fabricating the sleeve 30 is illustrated in FIGURE 1.

Reference numeral 10 indicates a conventional plastic tube extruder which operates to extrude a continuous sleeve 30 through an annular die 11. The sleeve 30 then passes between opposed flattening rollers 12 which form the sleeve into a web 31 with sharp marginal edges 54 and 55 which are carried between opposed heating elements 13 and 14 to form a first pair of parallel thermo-sealed integral external ribs 25 and 26 approximately three-sixteenths inch wide.

Each marginal edge portion of the web 31 then passes between matching die rolls 16 and 17 which form spaced transverse reinforcing seals or extended edge seals 18 extending perpendicular to the longitudinal dimension of ribs 25 and 26. These seals are produced at spaced intervals by cooperating "lands" on rolls 16 and 17 which simultaneously engage web 31.

After transverse seals 18 are formed, the web 31 passes between embossing rolls 19 and 20 which emboss transverse fold lines which facilitate container fabrication. Thereafter the web may be passed through printing rollers, not shown, after which the web is rolled on a take-up reel 21 and stored or shipped to a dairy or other packaging facility.

It is to be understood that the extruding machine 10 could be located at the ultimate packaging plant, if desired, in which case, the rolling of the web 31 on a reel could be omitted with the following steps carried out in situ. However, this arrangement is not always feasible or economical.

Figure 5:
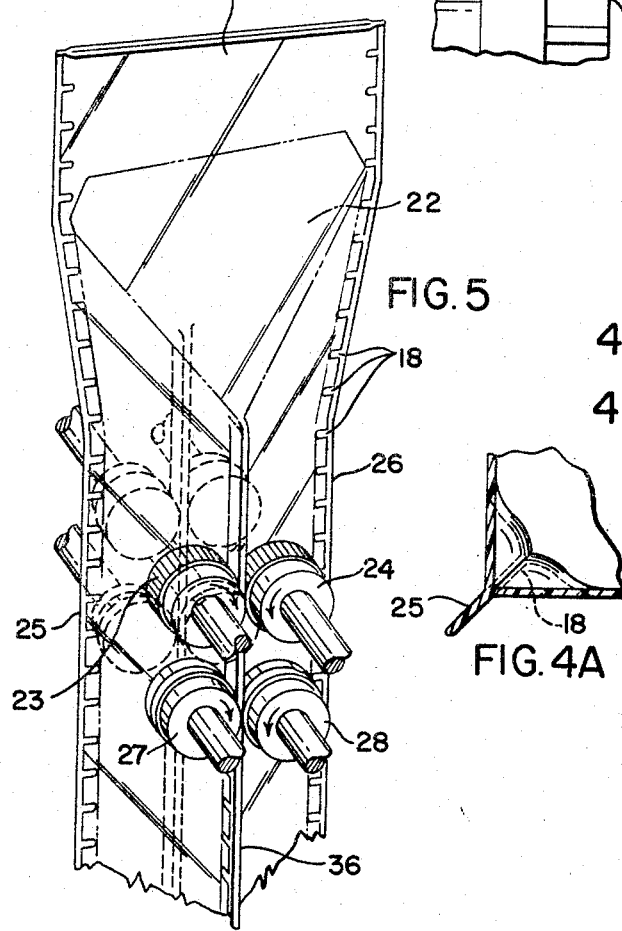
FIGURE 5 is a schematic diagram in perspective showing the second stage in the fabrication of a self-supporting container according to the invention wherein a second pair of opposed integral external ribs are formed at the intersection of the side panels.
Figure 4A:
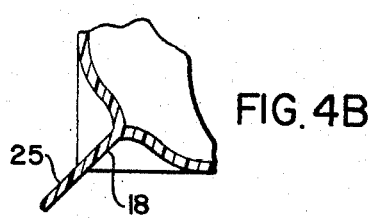
FIGURES 4A and 4B are fragmentary transverse cross-sectional views, on an enlarged scale, taken along the lines 4A—4A and 4B—4B, respectively, of FIGURE 3.
Figure 4B:
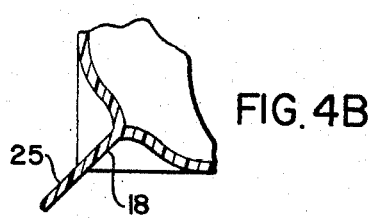

At the dairy or other packaging facility, in this case a dairy, the web 31 is unwound from the reel 21, straightened, and expanded as shown in FIGURE 5 by means of a mandrel 22, or alternatively air pressure or other suitable means. The mandrel serves to expand the web 31 to a generally rectangular or square cross-section as shown with the ribs 25 and 26 located at the intersection of two sides thereof. The other two corners formed by the intersection of the sides of the square tubular sleeve are then passed between opposed heating elements 23 and 24 to form a second pair of parallel thermo-sealed integral external flat ribs 35 and 36, again approximately three-sixteenths inch wide as seen in FIGURE 5. Thereafter the marginal edge portions of the web 31 adjacent the ribs 35 and 36 passed between two other pairs of die rolls 27 and 28 which form additional transverse reinforcing seals 18 at spaced locations along the sides of the tubular length perpendicular to the ribs 35 and 36.

Figure 6:
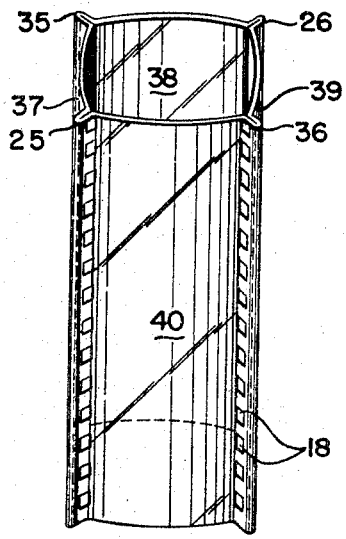
FIGURE 6 is a perspective view showing a portion of a continuous tubular length of plastic fabricated according to the steps indicated in FIGURES 1 and 4.
Figure 7:
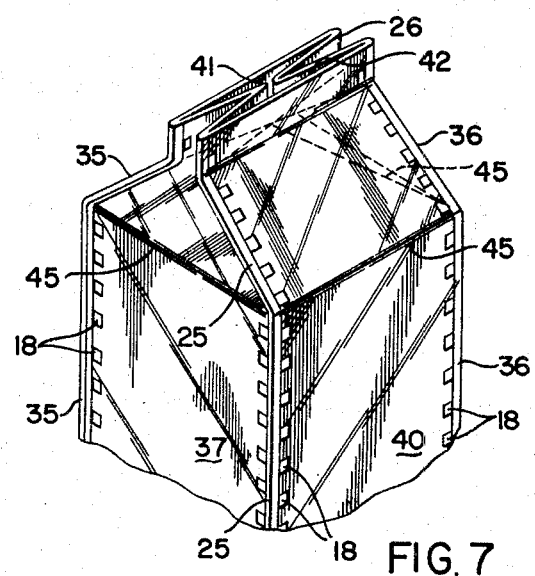

The sleeve 31 is then cut into container length blanks as shown in FIGURE 6. The so formed blank is substantially square in cross-section, forming a body having four thin-walled side panels 37, 38, 39 and 40 joined along their abutting edges through the four rigid ribs 25, 26, 35 and 36. The lower portions of the body panels 37, 38, 39 and 40 are then folded inwardly along horizontal score or transverse fold lines 45 produced by rolls 19, 20, which lines extend the full width of the body panels as seen in FIGURE 7.

Figure 8:
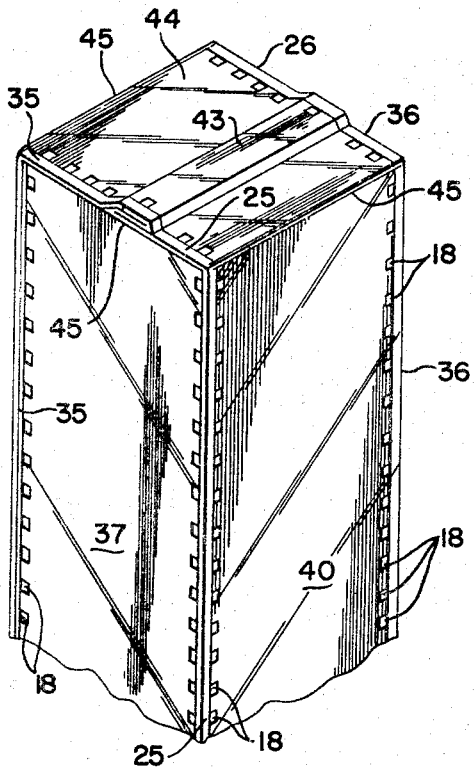

The opposed inner edges 41 and 42 of the panels are overfolded in a plane extending crosswise in the sleeve at 90° to the panel ribs 25, 35, 26 and 36, and heat-sealed to form a bottom closure 44 having a rigid brace 43, preferably but not necessarily substantially perpendicular to the panels 37, 39 as can be seen most clearly in FIGURE 8. At this point the container is made to assume an upright position and filled with milk or other liquid to be packaged.

Figure 9:
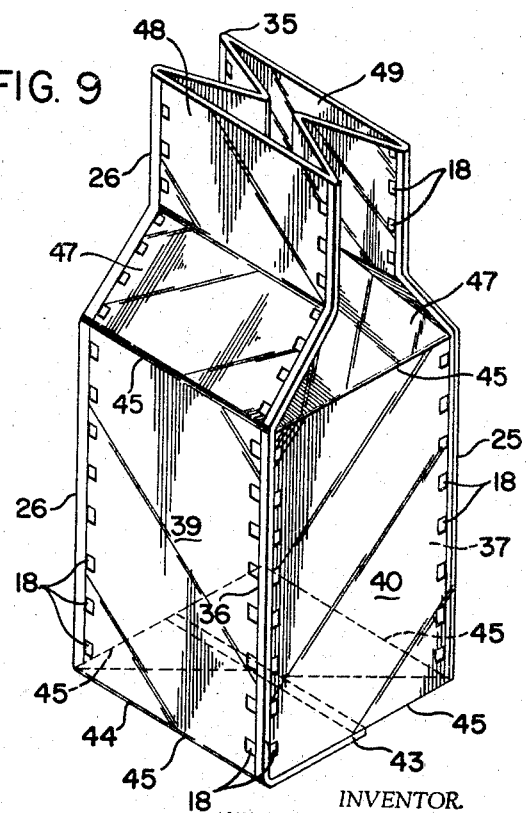

A top closure is then formed by folding the upper portions of the body panels inwardly from horizontal score lines 46 extending the full width of each panel, to a centerline extending crosswise of the body as seen in FIGURE 9. The folded, opposed panel ends 48 and 49 are made to extend upward from their meeting points at the centerline in a plane perpendicular to the bottom closure 44 to define a handle 51 as seen in FIGURE 10. Alternatively, the top may be sealed first, the container inverted and filled, and the bottom sealed last.

A rectangular flap 52 is cut in the vertical handle portion 51, and folded around the top edge of the handle to define a rectangular finger-grip opening 53 for the handle, as seen in FIGURE 11. Handle 51 is then compressed between heated elements to thermo-seal the several panel layers to make a relatively thick handle. The handle 51 thus becomes a second rigid brace.

The top closure of the container 50 illustrated has a slightly gabled configuration, to allow for the normal expansion of its contents, although it is to be understood that a flat configuration could be used if the expansion of the contents is no problem. Alternatively, other types of closures and handles may be employed or the handle may be omitted.

It will be evident from a study of FIGURE 11 that the several ribs 25, 26, 35 and 36 and the braces 43 and 51 cooperate to provide a rigid supporting frame for the relatively thin body panels so that the container 50 is self-supporting. Container 50 maintains its upright square configuration even when fully filled because transverse seals 18 reduce bulging.

FIGURES 12 and 13 illustrate an alternate method of providing the rigid supporting frame for the sleeve 60. This method employs rigid tubes or solid rods 65, 66, 67 and 68 made from the same or different material as that composing the sleeve 60, and approximately one-eighth inch in diameter.

In this method the circular sleeve 60 is made to assume a square configuration with recesses 61, 62, 63 and 64 open to the interior, formed in each corner. The rigid tubes, or rods, 65, 66, 67 and 68 are positioned in the recesses as seen in FIGURE 12. Then the recesses are pinched together against the tubes by the passage of heated elements along sealing line 69 to heat-seal the same so that the rigid tubes are tightly embedded therein, along each of the four edges to serve as structural supports for the body panels 70, 71, 72 and 73 as seen in FIGURE 13.

The embedded supports serve the same purpose as the rigid flat ribs 25, 26, 35 and 36 of the first described container. Alternatively, the tubes 65, 66, 67 and 68 may be adhered to the exterior of sleeve 60. Further, tubes 65, 66, 67 and 68 may be connected together to form a handle.

The formation of the container from this point on is the same as set forth hereinbefore.

This construction (FIGURES 12 and 13) permits the use of extremely thin-walled plastic sleeves since the rigidity of the frame formed by the tubes 65, 66, 67 and 68 bears no relation to the sleeve thickness, as is the case with the flat rib construction (FIGURE 9) wherein the ribs 25, 26, 35 and 36 are actually formed from the sleeve itself. Further, various types of pouring spouts could be provided with these embodiments.

Figure 14:
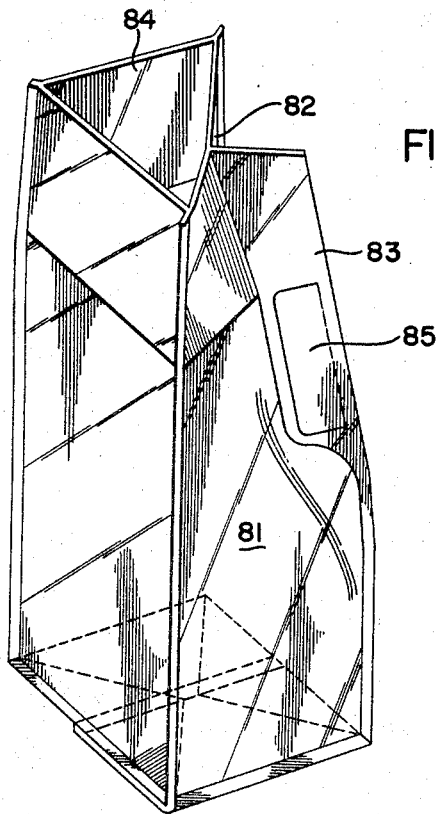
FIGURES 14 through 16, inclusive, illustrate a method for making an alternate form of the invention wherein a pouring handle is formed at the intersection of two side panels of the container.
Figure 15:
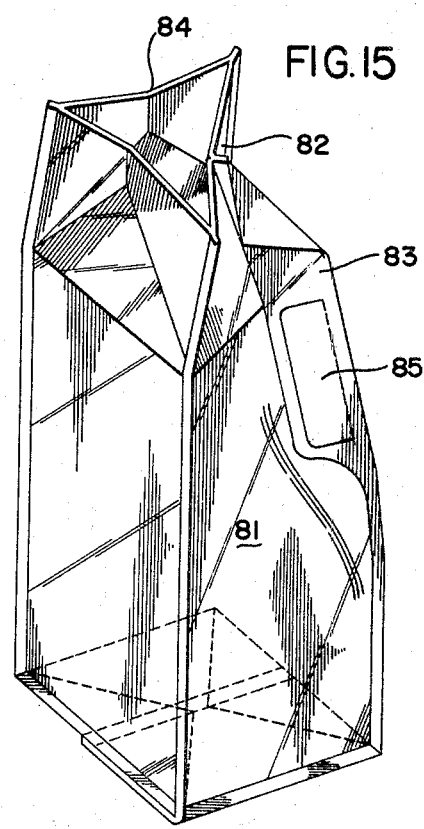
Figure 16:
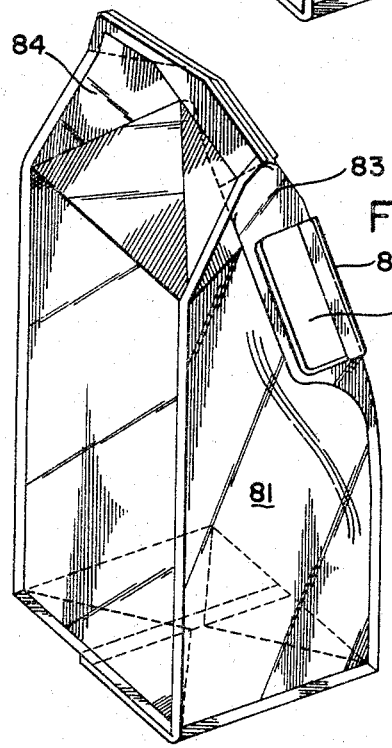

FIGURES 14 to 16 show an alternate form of container embodying the invention which differs from the other embodiments primarily in that an integral pouring handle is provided for use in pouring liquids from the open top of the container. In order to form the handle adjacent portions of the plastic sheet at the intersection of two of the four side walls 81 and 82 are adhered together to form a relatively wide flat strip 83 adjacent the top closure 84. This initial step in forming the handle is best shown in FIGURE 14 and is completed prior to the closing and folding of the top closure. It will be seen that the open end of the container as viewed in FIGURE 14 becomes almost triangular in transverse cross-section due to the quantity of plastic sheet material which goes into the double thickness strip 83.

To form the handle a flap 85 is cut out from the strip 83 as shown in FIGURES 14 and 15 to form an opening 86 as shown in FIGURE 16. The flap 85 is preferably wrapped around the adjacent portions of the strip 83 and adhered thereto such as by heat-treating to form a finger grip for the handle having several times the thickness of the sheet. The upper end of the resulting container is then creased and folded as shown in FIGURE 15 and then sealed in the manner shown in FIGURE 16 to provide a top closure of the container.

Once the container is opened with the packaged liquid carried therein the handle may be used to pour the liquid as from a pitcher into an appropriate receptacle. After a desired quantity of the liquid has been removed, the top closure may again be temporarily sealed and the container returned to a convenient storage location, such as a refrigerator in the case of milk and fruit juices.

While the invention has been shown and described with respect to specific embodiments of the method and article thereof, it will be understood that other variations and modifications will be apparent to those skilled in the art from the foregoing specification and appended claims and that such variations and modifications are within the intended spirit and scope of the invention. Accordingly, the specification and claims are not to be interpreted in any manner inconsistent with the extent to which the progress in the art has been advanced by the invention.

I claim:

1. In a thin-walled container formed of a single tubular flexible plastic sheet, said container including an upright tubular body portion having generally polygonal side panels, the improvement which comprises means for providing rigidity for said tubular body portion at the intersections of said side panels, said means including at each of said intersections, an external rib formed of adhered together portions of said single flexible plastic sheet, said portion comprising edges of said side panels adjacent the said intersection.

2. A container as defined in claim 1 wherein said side panels are generally rectangular.

3. A container as defined in claim 1 wherein said container has a transverse cross-section which is generally rectangular.

4. A container as defined in claim 1 wherein said adjacent portions of said flexible plastic sheet in said ribs are adhered by heat-sealing.

5. A container as defined in claim 1 wherein said side panels are provided with spaced transverse seals angularly disposed relative to said ribs.

6. A container as defined in claim 5 wherein said transverse seals extend inwardly from the intersections of said side panels less than one-fourth the width of said side panels.

7. A container as defined in claim 1 wherein said means for providing rigidity for said body portion at each intersection of said side panels includes a rigid, hollow tube interposed between said adjacent portions of said flexible plastic sheet.

8. A container as defined in claim 1 wherein said means for providing rigidity for said body portion at each intersection of said side panels includes a rigid, solid rod interposed between said adjacent portions of said flexible plastic sheet.

9. In a thin-walled, liquid-tight container formed of a tubular length of flexible plastic sheet, said container including an upright body portion having generally polygonal side panels and a generally quadrilateral transverse cross section, a closed base and a top closure, the improvement which comprises rib means for providing rigidity for said body portion at the intersections of said side panels, said means including at each of said intersections, two adjacent portions of said flexible plastic sheet adhered to form an integral external rib and a pouring handle adjacent one of said intersections said handle comprising adjacent portions of said plastic sheet adhered together to form a strip at the upper portion of one of the intersections of the side walls of said body portion, and means defining an opening in said strip to provide a finger grip.

10. A tubular, self-supporting, liquid-tight container formed from a single sheet of thermoplastic material, said container having four side panels and a flat bottom closure defining a substantially rectangular compartment, said container comprising:

(a) a body portion formed from a single tubular sheet defined by four, vertically extending, rectangular side panels, the adjacent edges of which are heat sealed at the intersection of said side panels forming rigid ribs integral therewith and extending the length thereof;

(b) the lower portions of said body panels being inwardly folded, along horizontal lines extending the full width of said panels, with their ends overfolded and heat-sealed along the overfold, to form a bottom closure having a stiffening brace;

(c) the upper portions of said body panels being folded inwardly to a center line crosswise of the body portion to form a top closure, the opposed panels being heat-sealed to provide a rigid stiffening brace, whereby the several ribs and braces cooperate to provide a rigid supporting frame for the body panels.

11. In a method of making a thin-walled, liquid-tight container of flexible plastic sheet, the improvement which comprises the steps of:

(a) adhering adjacent narrow superposed longitudinal portions of a tubular length of said plastic sheet at at least three perimetrically spaced locations to form at least three integral parallel external ribs;

(b) forming a container body portion of polygonal cross-section intermediate the ends of said length, said ribs being located at the intersections of the side walls of said body portion; and (c) collapsing and sealing the opposite ends of said length to provide a closed base at one end and a top closure at the other end.

12. A method as defined in claim 11 wherein the step of forming integral ribs includes the step of forming integral ribs of varying width.

13. A tubular length of plastic material of substantially uniform lateral dimension having opposed edge portions adhered to form longitudinal integral external ribs and spaced transverse seals angularly disposed inwardly a short distance relative to said ribs, and having a plurality of embossed transverse fold lines defining a plurality of container forming body panels including upper portions adapted to form top closures and bottom portions adapted to form bottom closures for said container.

References Cited

UNITED STATES PATENTS

| | | | |
|---|---|---|---|
| 3,003,681 | 10/1961 | Orsini | 229—57 |
| 3,164,695 | 1/1965 | Sanni | 206—56 |
| 3,302,860 | 2/1967 | Schwarzkopf | 229—54 |

FOREIGN PATENTS 620,232 10/1961 Italy.

DAVID M. BOCKENEK, *Primary Examiner.*

U.S. Cl. X.R.

229—37, 17; 53—29